United States Patent
Betzler et al.

(10) Patent No.: US 10,055,249 B2
(45) Date of Patent: Aug. 21, 2018

(54) AUTOMATED COMPLIANCE EXCEPTION APPROVAL

(71) Applicant: International Business Machines Corporation, Armonk, NY (US)

(72) Inventors: Boas Betzler, Magstadt (DE); Andreas Kuehmichel, Mainz (DE); Volker Nachtwey, Bad Soden (DE); Klaus-Thomas Schleicher, Diez (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/650,639

(22) Filed: Jul. 14, 2017

(65) Prior Publication Data
US 2017/0315837 A1 Nov. 2, 2017

Related U.S. Application Data

(63) Continuation of application No. 14/953,260, filed on Nov. 27, 2015, now Pat. No. 9,773,122.

(51) Int. Cl.
*G06F 9/455* (2018.01)
*G06F 21/57* (2013.01)
*G06F 8/61* (2018.01)

(52) U.S. Cl.
CPC ........... *G06F 9/45558* (2013.01); *G06F 8/61* (2013.01); *G06F 21/577* (2013.01); *G06F 2009/45562* (2013.01)

(58) Field of Classification Search
CPC ...... G06F 9/45558; G06F 8/61; G06F 21/577; G06F 2009/45562
See application file for complete search history.

(56) References Cited

U.S. PATENT DOCUMENTS

| 6,512,986 | B1 | 1/2003 | Harmon |
| 7,885,943 | B1 | 2/2011 | Yehuda |

(Continued)

OTHER PUBLICATIONS

MyCSF_ExceptionManagement, https://hitrustalliance.net/documents/mycsf/mycsf_information/MyCSFExceptionManagement.pdf, Oct. 28, 2014.

(Continued)

*Primary Examiner* — Beemnet Dada
(74) *Attorney, Agent, or Firm* — Anthony V S England; Nicholas D. Bowman

(57) ABSTRACT

Automated approval of a non-compliance of a modified configuration of a computer system includes performing a compliance check by a compliance management system. The modified configuration results from deploying a pre-approved modification pattern by a package management system modifying an initial configuration of the computer system. The modification pattern is provided by a software package that specifies at least one modification to be applied to the initial configuration and at least one compliance exception pre-approval specifying pre-approved non-compliances of modifications with compliance rules. Responsive to detecting a non-compliance, the non-compliance is compared with the pre-approved non-compliances. In response to determining that the detected non-compliances are not matching any pre-approved non-compliances, a compliance exception approval is requested. The detected non-compliance is approved in response to receiving the compliance exception approval for the detected non-compliances.

20 Claims, 8 Drawing Sheets

(56) References Cited

U.S. PATENT DOCUMENTS

| | | |
|---|---|---|
| 8,170,902 B2 | 5/2012 | Kennis |
| 8,234,641 B2 | 7/2012 | Fitzgerald |
| 8,751,620 B2 | 6/2014 | Anderson |
| 8,782,201 B2 | 7/2014 | Kephart |
| 9,124,639 B2 | 9/2015 | Srinivasan |
| 9,444,849 B2 | 9/2016 | Angus |
| 9,773,122 B2 * | 9/2017 | Betzler .............. G06F 21/6218 |
| 2012/0159133 A1 | 6/2012 | Talwar |
| 2013/0247136 A1 | 9/2013 | Chieu |
| 2015/0213268 A1 | 7/2015 | Nance |

OTHER PUBLICATIONS

Exceptions Management I Rsam GRC—Governance, Risk, and Compliance Solutions, http://www.rsam.com/solutions/rsam-grc/exception-management.html, Oct. 28, 2014.
List of IBM Patents or Patent Applications Treated as Related.
Betzler, Boas, et al. "Automated Compliance Exception Approval," U.S. Appl. No. 14/953,260, filed Nov. 27, 2015.

* cited by examiner

US 10,055,249 B2

AUTOMATED COMPLIANCE EXCEPTION APPROVAL

BACKGROUND

The present disclosure relates to the field of compliance managing of a computer system and more particularly to the field of handling compliance exceptions. The invention relates further to a computer system and a computer program product for compliance management.

For modern computer systems being a key part of the infrastructure of a large variety of organizations, whether business, governmental or non-governmental, compliance management is an important process for guaranteeing a proper functionality of the systems in accordance with legal, economical and organizational requirements. Thus, physical servers and workstations, even virtualized computing resources, need to comply with certain compliance rules e.g. based on company policies and legal requirements regarding hardware as well as software configuration and security. A large variety of software products and solutions that help IT administrators to monitor policy compliance are known. Due to their complexity and evolutionary development by continuous integration of additional elements and updating of integrated elements, modern computer systems often show deviations from those pre-defined compliance rules, when being checked by a compliance management system.

SUMMARY

A computer-implemented method for automated approval of a non-compliance of a modified configuration of a computer system with at least one compliance rule by a compliance management system includes performing a compliance check of the modified configuration of the computer system by the compliance management system. The modified configuration of the computer system results from deploying a pre-approved modification pattern by a package management system modifying an initial configuration of the computer system according to a modification pattern. The modification pattern may be provided by at least one pre-approved modification pattern as a software package specifying at least one modification to be applied to the initial configuration of the computer system and at least one compliance exception pre-approval assigned to the respective modification pattern. Each of the respective at least one pre-approvals may specify a pre-approved non-compliance of at least one of the respective modifications with the at least one compliance rule. The method further includes comparing, in response to detecting a non-compliance with the at least one compliance rule, the detected non-compliance with the at least one pre-approved non-compliance from the software package provided to the compliance management system by the package management system. In response to determining that the detected non-compliance is not matching with any of the pre-approved non-compliances, the method includes requesting a compliance exception approval for the detected non-compliance. The method further includes approving the detected non-compliance in response to receiving the compliance exception approval for the detected non-compliance.

In other embodiments of the invention, other forms are provided, including a system and a computer program product.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
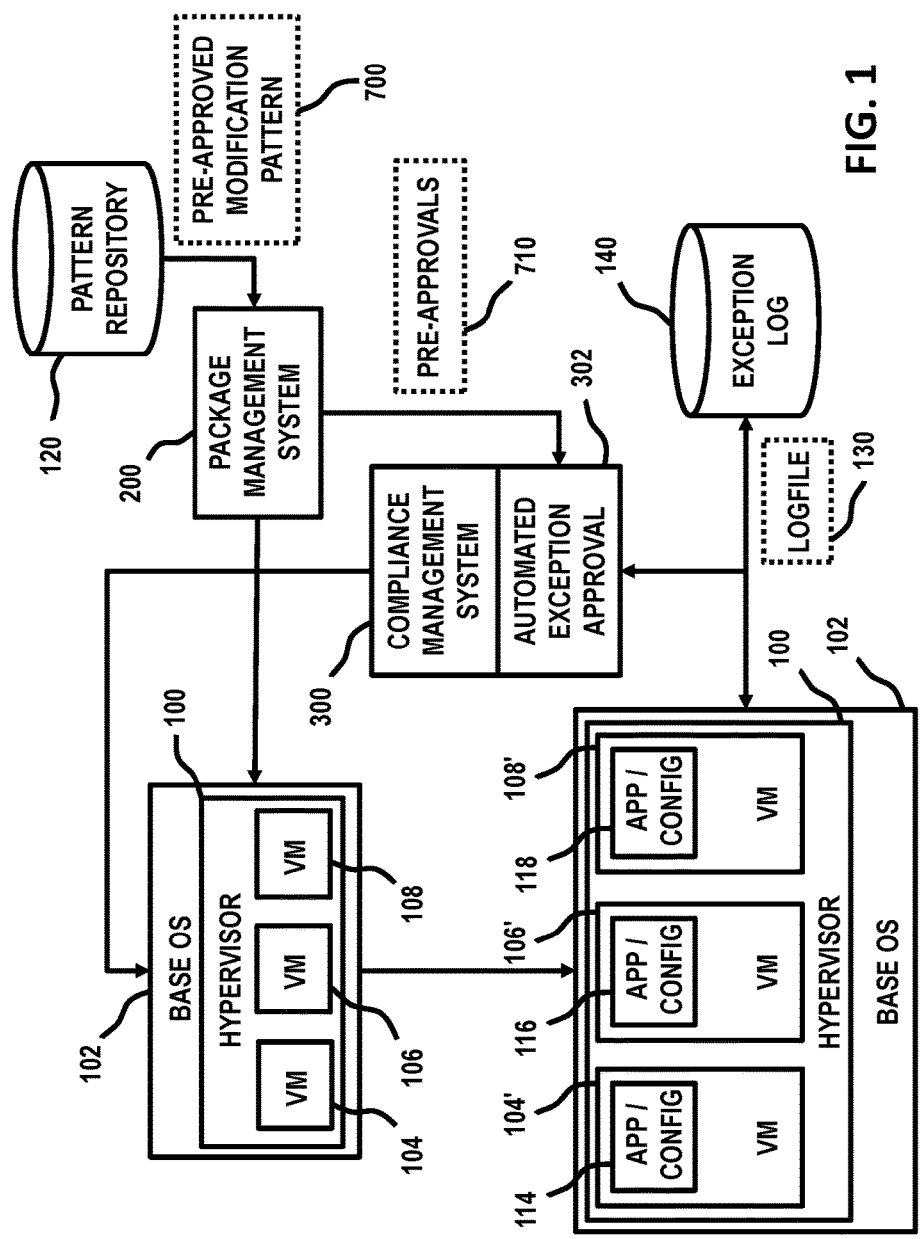
FIG. 1 depicts a schematic block of an exemplary method for automated approval of a non-compliance of a modified configuration of a computer system.

Embodiments of the present invention may include the following example features:

The term 'compliance' of a computer system, i.e. a hardware system and/or a software system like e.g. a VM, implemented in software, firmware or hardware, may denote that the related computer system may be aligned with a set of pre-defined rules, i.e. compliance rules, in terms of its configuration and/or software that may be installed and/or executed. It may also concern data access rules, users allowed to access the system, potential malware and/or any other rule ensuring a secure operation of the computer system. In this sense, the term non-compliance may denote a status in which the related system may compromise any of the one or more pre-defined compliance rules. A system may thus be in a compliant state, if the system operates according to the pre-defined compliance rules. The system may be in a non-compliant state, if the operating system compromises at least one of the pre-defined compliance rules.

The term 'compliance management system' may denote a set of functions, in particular implemented in software, firmware or hardware, checking features and functions of a computer system to ensure that the predefined one or more compliance rules are met.

In general, compliance means conforming to a rule, such as a specification, policy, standard or law. Regulatory compliance describes the goal that organizations aspire to achieve in their efforts to ensure that they are aware of and take steps to comply with relevant laws and regulations.

Compliance rules may be derived from or relate to various standards and legal requirements, like e.g. standards provided by the International Organization for Standardization (ISO): series ISO 9000, ISO 14000, ISO 31000, ISO 45001, ISO 55000, ISO 22000; the Occupational Health- and Safety Assessment Series OHSAS 18001; Health Insurance Portability and Accountability Act of 1996 (HIPAA); Sarbanes-Oxley Sarbanes-Oxley Act of 2002; rules provided by food and drug administration (FDA), the International Electrotechnical Commission (IEC) producing international standards in the electro-technology area; or some local or international specialized organizations such as the American Society of Mechanical Engineers (ASME). Thereby, a wide range of rules and directives is provided to ensure compliance of the products to safety, security or design standards. There are a number of other regulations which apply in different fields, such as PCI-DSS, GLBA, FISMA, and Joint Commission. In some cases other compliance frameworks, such as COBIT, or standards, e.g. NIST, inform on how to comply with the regulations.

The term 'virtual machine' (VM) may denote an emulation of a computer system. Virtual machines operate based on the computer architecture and functions of a real or hypothetical computer system. Their implementations may involve specialized hardware, firmware, software, or a combination thereof. Virtual machines may be classified based on the degree to which they implement functionality of targeted real machines. A 'system virtual machine', also referred to as full virtualization VMs, provides a complete system platform which supports the execution of a complete operating system (OS). A 'process virtual machine' is configured to execute a single computer program by providing an abstracted and platform-independent program execution environment.

A system virtual machine may be implemented using a type 1 or type 2 hypervisor: a type 1 hypervisor runs directly on the hardware, and a type 2 hypervisor runs on another operating system, i.e. a base OS. Each virtual machine can run any operating system supported by the underlying hardware. Users may thus run two or more different guest operating systems simultaneously, in separate private virtual machines.

A virtual machine may for example be executed on a server system in a data center, but may also be deployed on a personal computing device such as a PC, a tablet or any other mobile device.

A compliance test may be performed using a compliance management system running in a VM. The compliance management system may be implemented as an application program running on the VM. Since more than one VM may run on a hypervisor on a physical hardware, it may be possible to control and supervise compliance according to compliance rules individually per VM. Compliance rules may be different to VM on the same hypervisor and/or physical hardware. Hypervisors may also be supervised, i.e. checked for compliance, using different compliance rules.

The term operating system (OS) as use herein may refer to system software that manages computer hardware and software resources and provides common services for computer programs. The OS may enable application programs usually requiring an operating system to run on the computer system.

The term 'hypervisor', also referred to as virtual machine monitor (VMM), may denote a piece of computer software, firmware or hardware that may create and run VMs. A computer on which a hypervisor may run one or more VMs may be defined as a 'host machine'. Each VM may be is called 'guest machine'. The hypervisor may present the guest operating systems with a virtual operating platform and may manage execution of the guest operating systems. Multiple instances of a variety of operating systems may share the virtualized hardware resources. More than one hypervisor may be deployed on one physical server. A hypervisor may run directly on the system hardware, i.e. type 1 hypervisor, or on a host operating system, i.e. type 2 hypervisor.

The term 'package management system' may denote a set of functions, in particular implemented in software, firmware or hardware, automating the process of installing, upgrading, configuring, and removing software packages for an operating system of a computer device and for applications installed on the operation system in a consistent manner. A package management system may further maintain a database of software dependencies and version information to prevent software mismatches and missing prerequisites.

The term 'package', also referred to as software package, as used herein may refer to software provided in form of a package that has been built from source with a package management system (PMS). Packages are distributions of software, applications and data. A package may be provided as compiled code with additional metadata such as a package description, package version, checksum, or dependency specifications regarding features of a computer system required for the software to run properly. A package management system may evaluate metadata to allow package searches, to perform automatic upgrades, to check that all dependencies of a package are fulfilled and/or to fulfill them automatically by installing missing packages.

A package installation may be performed using a package management system running in a VM. The package management system may be implemented as an application program running on the VM.

To make complex computer systems satisfy compliance rules may require redesign and code changes or even a severe degradation of performance. For this reason, a risk assessment regarding those deviations from compliance rules may be performed and the costs of changes required for implementing full compliance may be compared with the level of risk induced by the deviations. Based on the result of the risk assessment, a deviation from the compliance rules may be approved.

Embodiments may comprise a method and a computer system providing software packages comprising compliance exception pre-approvals using deployment patterns. According to embodiments the pre-approved modification patterns as well as the compliance exception approvals are signed with a digital signature. These signed patterns are used for automating compliance management processes. Known exception approval processes comprising risk assessment in contrast are costly, since in most cases they have to be performed manual and often repetitively.

Examples of such exceptions from compliance requirements which may be approved are the following:
 a certain application requires an executable file to be stored in the root directory of the computer system;
 a certain set of ports between a first and a second computer system need to be opened for a certain application to work properly by transferring data between the two systems;
 a certain network service on a computer system needs to be enabled to listen on a port;
 a certain required fixing of problem cannot be applied to a system without affecting applications running on the system to stop functioning.

Embodiments may use patterns in a software defined infrastructure (SDI). SDI refers to a technical computing infrastructure entirely under the control of software, i.e. defined and controlled by machine-readable documents. An SDI may operate independent of hardware-specific dependencies and be programmatically extensible. Application requirements may be defined from the infrastructure, functional as well as non-functional requirements, and have the configuration automatically derived and created. An SDI may be configured to enable a transition from one configurations to another with none or only little downtime. Thus, achieving complete system landscape changes via software. Furthermore, SDI may have versioning of the system landscapes enabling rollback and cloning. Compliance has so far seen little focus in SDI. However, even in SDI compliance exception approvals are needed.

Term 'pattern' as used herein may denote a general reusable solution to a problem within a given context in software design. A pattern is a description or template for how to solve the respective problem. It comprises a set of functions provided in a structural form according to the template. The functions defining the measures like installing installable elements and/or modifying configuration settings which have to be performed in order to solve the problem.

The term 'modification pattern' as used herein may denote a set of functions, in particular implemented in software or hardware, provided in a structural form according to a template for performing a certain modification of the configuration of a computer system, i.e. software and/or hardware. According to embodiments a modification pattern may be tied to a compliance exception pre-approval.

According to embodiments, the present method may be used for limiting the scope of modifications applied to the configuration of a computer system such that a compliance check of the modified configuration results in a documented exception statement with reference to one or more compliance rules. Regarding such a limited and clearly delineated scope of modification, a complete and detailed risk assessment and exception approval process, manual or automated, may be performed once for a given modification pattern in order to provide a compliance exception approval. This compliance exception approval may be used as a compliance exception pre-approval for future deployments of the respective modification pattern. For this purpose the compliance exception pre-approval is packaged together with the respective modification pattern generating a pre-approved modification pattern in package form. All compliance exception assessments and approvals of subsequent deployments of the modification pattern may be reduced to an automated comparison of the compliance exceptions detected with the pre-approved compliance exceptions provided by the package and a documentation of matching pre-approved exceptions.

This may have the beneficial effect of reducing costs and the requirement for repeatedly performing complex and detailed risk assessments as well as manual interventions. Furthermore, improvements on quality may be achieved by apply the same high quality standard for generating a pre-approval for all subsequent compliance findings, i.e. detections of non-compliance.

Regarding compliance exceptions and approvals of the same, there may be a large percentage of repeated patterns which may be handled more efficiently using pre-approved exception pattern.

An automated approval of exceptions may for example be implemented as follows:
  an initial computer system is provided which is compliant with a set of pre-defined compliance rules or comprises only such non-compliances that are documented and approved,
  a program code configured for performing a modification of the initially compliant computer system is generated in form of an automated deployment pattern of modification measures,
  the resulting modification pattern is applied to the initial configuration and a compliance check is performed by a compliance management system,
  detections of non-compliances are reported, reviewed and approved,
  the approved non-compliances are documented as compliance exception pre-approvals, assigned to the respective modification pattern and packaged with the same generating a package comprising a pre-approved modification pattern,
  applying the modification pattern of the package to a configuration of the same or another computer system,
  applying a compliance check by the same or another compliance management system using the same set of pre-defined compliance rules,
  comparing detected non-compliances to the pre-approved non-compliances provided by the compliance exception pre-approvals assigned to the modification pattern,
  in response to a matching of a detected non-compliance with a pre-approved non-compliance, the detected non-compliance is automatically approved by the compliance management performing the compliance check and the approval of the exception is documented.

Embodiments may provide a method for packaging compliance exception approvals together with a deployment pattern for modification to which the compliance exception approvals are assigned. The packages may contain installation and configuration files for implementing the modifications according to the modification pattern or references to the respective files, i.e. their storage location, for retrieving the same upon deploying of the modification pattern. A configuration file, also referred to as config file, may configure the settings for a modified configuration of a computer program. A configuration file may for example be provided in form of a simple database. A database as used herein is a collection of electronic information, i.e. data, which is organized in form of a particular, defined data structure which supports or is optimized for data retrieval by a particular type of query. The approved compliance exceptions may be documented as known and approved violations of compliance rules, i.e. compliance exception pre-approvals. Mitigation and secondary control requirements to be implemented for handling the risk arising from the pre-approved compliance exception may be automatically added. The respective mitigation and secondary control requirements may be implemented upon detection of the pre-approved compliance exception.

According to embodiments, the method further comprises: recording the automatic approval of the detected non-compliance to a logfile. This may have the beneficial effect that non-compliances which involve a certain risk due to compromising the compliance rules are tracked. Thus, using the logfile it may any time be checked which compliance rules are comprised by non-compliances of the configuration of the computer system and which approving authorities have provided the pre-approval of the respective non-compliances. The logfile may for example comprise details about the date of detection and/or approval of the non-compliance, the computer system comprising the non-compliance, the context of the non-compliance, like specification of the software or hardware component comprising the non-compliance, the type of the non-compliance, details about the non-compliance, an ID of the approving authority, litigation measures performed and/or secondary control requirements implemented regarding the non-compliance, etc. According to embodiments, each non-compliance detected may be recorded to a logfile. In case of an approval of the non-compliance, details about the approval are added.

According to embodiments, the method further comprises: in response to determining that the detected non-compliance is not matching with any of the pre-approved non-compliances, requesting by the compliance management system a compliance exception approval for the detected non-compliance, approving the detected non-compliance by the compliance management system upon receiving a compliance exception approval for the detected non-compliance. This may have the beneficial effect that non-compliances which have not been detected when generating the package may be efficiently dealt with. According to embodiments, received approval may be used to generate a new compliance exception pre-approval which may be added to the package as an additional compliance exception pre-approval assigned to the modification pattern comprised by the package.

According to embodiments, the method further comprises: cancelling non-compliant modifications of the first configuration of the first computer system for which no compliance exception approvals are received. This may have the beneficial effect that risks induced by a non-compliance which is not approved, e.g. due to the respective risks, may be efficiently prevented.

According to embodiments, the first configuration of the first computer system is compliant with the one or more compliance rules. This may have the beneficial effect that starting with a compliant computer system and accepting only approved non-compliances, when modifying the compliant configuration of the computer system, it may be ensured that at no time non-approved compliances are comprised by the modified configurations of the computer system.

According to embodiments, each non-compliance comprised by the first configuration of the first computer system is approved by a compliance exception approval. This may have the beneficial effect that starting with a computer system only comprising non-compliances which are approved and accepting only approved non-compliances, when modifying the compliant configuration of the computer system, it may be ensured that at no time non-approved compliances are comprised by the modified configurations of the computer system.

According to embodiments, the first computer system is a virtual machine and modifying the first configuration of the first computer system comprises modifying software installed on the respective virtual machine. This may have the beneficial effect that by the present method the compliance of a software defined infrastructure and in particular non-compliances comprised by the SDI are efficiently and effectively handled.

According to embodiments, the method further comprises for generating the pre-approved modification pattern: receiving by a second package management system the modification pattern, deploying the modification pattern by modifying a second configuration of a second computer system according to the modification pattern, performing a compliance check of the modified second configuration by a second compliance management system, in response to detecting one or more non-compliances with the one or more compliance rules, requesting one or more compliance exception approvals for the detected non-compliances, receiving one or more compliance exception pre-approvals assigned to the detected non-compliances, generating by the second package management system the software package comprising the modification pattern and the one or more compliance exception pre-approvals. This may have the beneficial effect that a package is generated which comprises all data necessary for an automated and efficient handling of the modification of a configuration of a computer system. Further, the compliance exception pre-approval may be generated once and used repeatedly for assessing subsequent non-compliance detections, when subsequently deploying the package to the same or other computer systems.

According to embodiments, the method comprises: in response to generating the software package, storing the software package in a software package repository, receiving the software package of the pre-approved modification pattern from the software package repository in response to sending a request to the respective repository. This may have the beneficial effect that the pre-approved modification pattern in form of the package may be easily retrieved in case of need. The package may for example be retrieved via a network like the Internet or an intranet.

According to embodiments, the first and second compliance management systems are the same compliance management system. This may have the beneficial effect that the compliance management system may be used for compliance checks of a plurality of computer systems. The compliance rules used may be the same for each computer system, allowing for a high probability that a matching of detected non-compliances and pre-approved non-compliances may be found. According to embodiments, the compliance management system may apply different compliance rules to different computer systems. According to embodiments, the first and second package management systems are the same package management system. According to embodiments, the first and second computer systems are the same computer system.

According to embodiments, the compliance exception pre-approval is assigned with a first digital signature and an ID identifying an approving authority. The method further comprises: upon receipt of the compliance exception pre-approval, verifying by the first compliance management system the first signature and the authorization of the approving authority identified by the ID. This may have the beneficial effect that the authenticity and integrity of the compliance exception pre-approvals may be checked efficiently. Thus, it may be ensured that the pre-approval adopted by the compliance management system is a valid approval which has been generated by an approving authority capable and authorized of providing a suitable approval.

According to embodiments, the pre-approved modification pattern is assigned with a second digital signature, the method further comprises: upon receipt of the pre-approved modification pattern, verifying the second signature. This may have the beneficial effect that the authenticity and integrity of the pre-approved modification pattern, i.e. the package, may be ensured and checked efficiently.

According to embodiments, the modification pattern further comprises machine-readable installation instructions specifying an installation procedure to be applied and machine-readable configuration instructions specifying post-installation configuration adjustments to be applied. The modifying of the first configuration of the first computer system comprises: executing the respective installation instructions, executing the respective configuration instructions. This may have the beneficial effect that the package provides all data required for efficiently modifying the configuration of the first computer system by installing installable elements and adjusting the configuration setting of the resulting configuration of the first computer system after the installation.

According to embodiments, the pre-approved modification pattern further comprises installable payload. The method further comprises: upon execution of the installation instructions installing the installable payload. This may have the beneficial effect that the package provides all files required for efficiently performing a modification of the computer system.

According to embodiments, the pre-approved modification pattern further comprises one or more references to one or more installable files. The method further comprises: upon execution of the installation instructions requesting, receiving and installing the respective installable files. This may have the beneficial effect that the package provides all data required for efficiently performing a modification of the computer system.

According to embodiments, the pre-approved modification pattern further comprises machine-readable mitigation instructions specifying adjustments to be applied to the modifications of the first configuration specified by the modification pattern for mitigating non-compliances of the respective modifications. The method further comprises: executing the respective mitigation instructions. This may have the beneficial effect that risks induced by the non-compliances of the configuration of the computer system may efficiently be reduced. This reduction of risk may allow approving compliance exceptions which have become acceptable due to the litigation.

According to embodiments, the pre-approved modification pattern further comprises control instructions specifying requirements to be met when controlling the first computer system for deploying the respective pre-approved modification pattern. The method further comprises: controlling the first computer system according to the control requirements when deploying the respective pre-approved modification pattern. Such control requirements may for example specify data access and/or modification rules, users allowed to access the system or certain sectors of the same and/or perform modifications of the system or certain sectors the same. This may have the beneficial effect that risks induced by the non-compliances of the configuration of the computer system may efficiently be reduced. This reduction of risk may allow approving compliance exceptions which have become acceptable due to the modification of control requirements.

According to embodiments, the pre-approved modification pattern further comprises pre-conditions specifying requirements to be satisfied by the first configuration of the first computer system for deploying the respective pre-approved modification pattern. The method further comprises: checking whether the first configuration meets the requirements specified by the pre-conditions, in response to detecting a requirement specified by the pre-conditions which is not met by the first configuration, initiating an initial modification of the first configuration such that the first configuration meets the respective requirement. This may have the beneficial effect that it is ensured that the first configuration of the first computer system meets all requirements for efficiently deploying the pre-approved modification pattern.

FIG. 1 depicts a schematic block of an exemplary method for automated approval of a non-compliance of a modified configuration of a computer system. One or more computer systems in form of one or more virtual machines (VM) 104, 106, 108 may be provided. The VMs may be implemented on a hypervisor 100, also referred to as virtual machine monitor (VMM). The hypervisor may for example be implemented in form of a hosted, i.e. type 2, hypervisor running on a base operation system (OS) 102. According to other embodiments, the hypervisor may for example be implemented in form of a native, i.e. type 1, hypervisor running directly on hardware of a host to control the hardware and to manage guest operating systems provided by the VMs 104, 106, 108. The compliance management system 300 may perform a compliance check of hypervisor 100 as well as virtual machines 104, 106, 108 with a set of compliance rules. The hypervisor 100 as well as virtual machines 104, 106, 108 may be compliant with the respective set of compliance rules or, in case of non-compliances, may be assigned with a set of exception approvals approving the respective non-compliances. The compliance management system 300 may also check the base OS. The package management system 200 may control the modification e.g. of the configurations of virtual machines 104, 106, 108 using pre-approved modification patterns 700 provided in form of packages. The configurations of virtual machines 104, 106, 108 may for example be modified by installing executable software elements, like applications (APPs), and/or by modifying the settings of the respective configurations. The pre-approved modification patterns 700 deployed by the package management system 200 may be retrieved from a pattern repository 120. By deploying one or more pre-approved modification patterns 700 retrieved from pattern repository 120, the package management system 200 may modify the configurations of virtual machines 104, 106, 108 resulting in set of virtual machines 104', 106', 108' with modified configurations. The modified configurations of virtual machines 104', 106', 108' may for example comprise additional applications and modified configuration settings 114, 115, 116. The respective applications and configuration settings may be specified by a modification pattern provided by package 700.

Upon modifying the configurations of virtual machines 104, 106, 108, the compliance management system 300 may be provided by the package management system 200 with a set of one or more compliance exceptions pre-approvals 710 provided by the package 700 and assigned to one or more of the modifications according to the modification pattern of package 700 deployed by the installation management system 200. The compliance exceptions pre-approvals 710 may be used by the compliance management system 300 for an automated compliance exception approval 302. The compliance management system 300 may check the compliance of the modified virtual machines 104', 106', 108' resulting from deployment of package 700. Non-compliances detected by the compliance management system 300 may be compared with the pre-approved non-compliances provided by the compliance exceptions pre-approvals 710. In response to a matching of a detected non-compliance with one of the respective pre-approved non-compliances 710 the automated exception approval 302 may automatically approve the detected non-compliance. Furthermore, pre-defined litigation measures and secondary control requirements provided by the package 700 and assigned to the pre-approved non-compliances 710 may be implemented e.g. by the compliance management system 300. A logfile 130 may be generated identifying e.g. a date of the non-compliance finding, the compliance rule(s) compromised, litigation measures and secondary control requirements implemented, the authority approving the compliance exception, and an identification of the respective compliance exception pre-approval applied. Each non-compliance finding may be recorded in a logfile like 130. Each compliance exception pre-approval may be identified with a unique task ID for an automated approval process to be applied. The respective task ID may be comprised by the logfile 130 as well. The logfile 130 may be stored in an exception log repository 140. Thus, in case all non-compliances detected match with pre-approved non-compliances 710, the compliance management system 300 may perform an entirely automated exception approval 302 resulting in a set of virtual machines 104', 106', 108' with modified configurations which may only comprise approved non-compliances.

Figure 2:
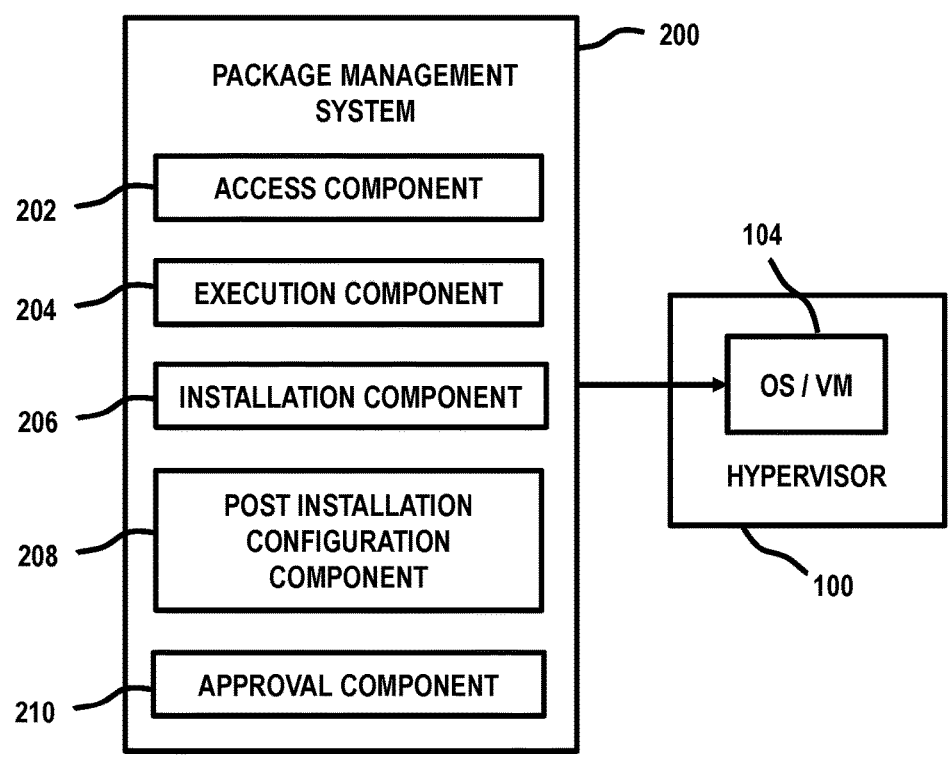
FIG. 2 depicts a schematic diagram illustrating an exemplary package management system.

FIG. 2 depicts a schematic diagram illustrating an exemplary package management system 200. The package management system 200 may comprise an access component 202 for accessing a VM 104 running on a hypervisor 100. The access component 202 may use SSH or any other remote execution protocol for accessing the VM 104. On the VM 104 an OS may run and on or more applications may be implemented. The package management system 200 may further comprise an execution component 204 for executing local commands on VM 104 preparing the installation of applications according to a modification pattern provided by a pre-approved modification pattern in package form, an installation component 206 for installing applications provided by the package on the VM 104, as well as a post installation configuration component 208 for modifying the configuration settings of VM 104 after installation of the applications with the installation component 206. The execution component 204 may comprise a local workflow engine to drive remote execution steps. The installation component 206 may transfer installation packages to the VM 104 and execute the installation of the respective packages. The post installation configuration component 208 may read post-installation instructions and configure the OS of VM 104 as well as other subsystems of VM 104 accordingly. Furthermore, the package management system 200 may comprise an approval component 210 for checking, whether pre-approvals are provided by the package. In response to detecting respective pre-approvals, the pre-approvals may be sent to a compliance management system.

Figure 3:
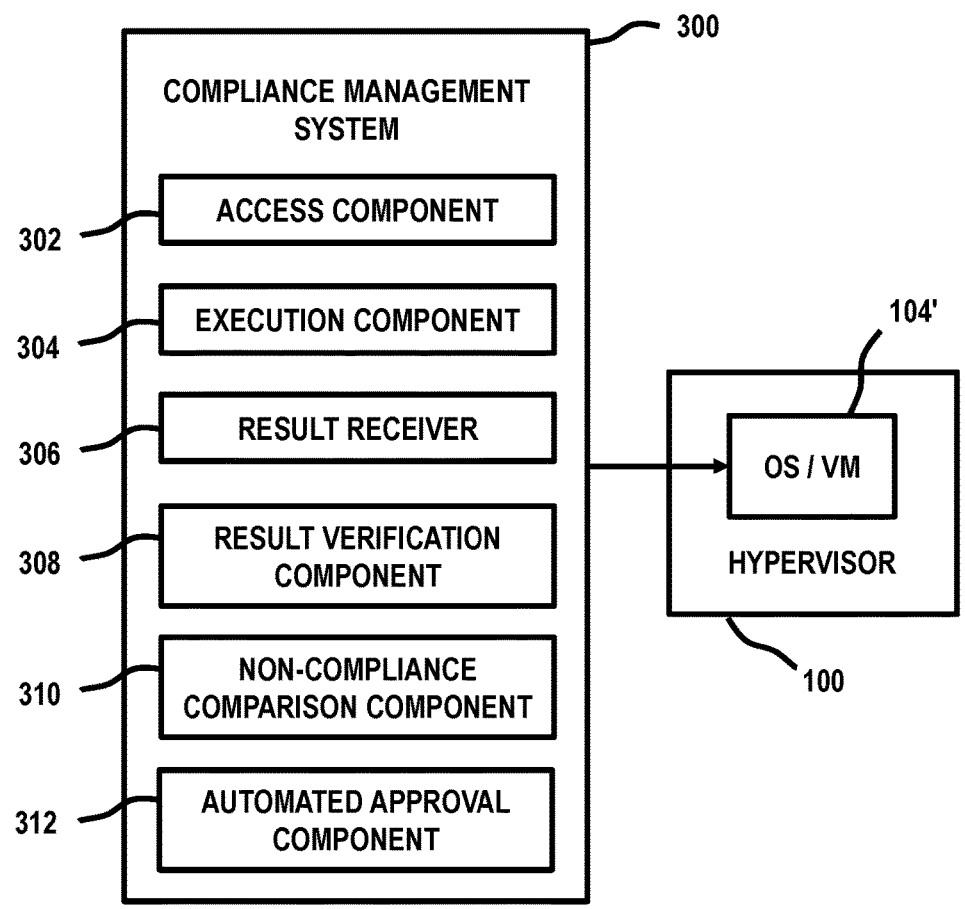
FIG. 3 depicts a schematic diagram illustrating an exemplary compliance management system.

FIG. 3 depicts a schematic diagram illustrating an exemplary compliance management system 300. The compliance management system 300 may comprise an access component 302 for accessing e.g. a modified VM 104' running on a hypervisor 100. The access component 302 may use SSH or any other remote execution protocol for accessing the VM 104'. The modified VM 104' may for example be the result of a pre-approved modification patter applied to the VM 104 of FIG. 2 by the respective package management system 200. The compliance management system 300 may further comprise an execution component 304 for executing local commands on VM 104'. The execution component 304 may comprise a local workflow engine to drive remote execution steps. The results of the execution of the respective local commands may be received by a result receiver 306. The result receiver may write the results of the remote execution to a local file. The received results may be compared with results expected for a compliant configuration of VM 104' by a result verification component 308. The result verification component 308 may detect deviations of the received results from the results expected for a compliant configuration. With these deviations compromising one or more compliance rules non-compliances may be determined. The non-compliance comparison component 310 may compare the non-compliances detected by the result verification component 308 with the pre-approved non-compliances according to the compliance exception pre-approvals provided by the package management system 200. For each detected non-compliance matching a pre-approved non-compliance, an automated approval may be performed by the compliance management system 300 using the automated approval component 312.

Figure 4:
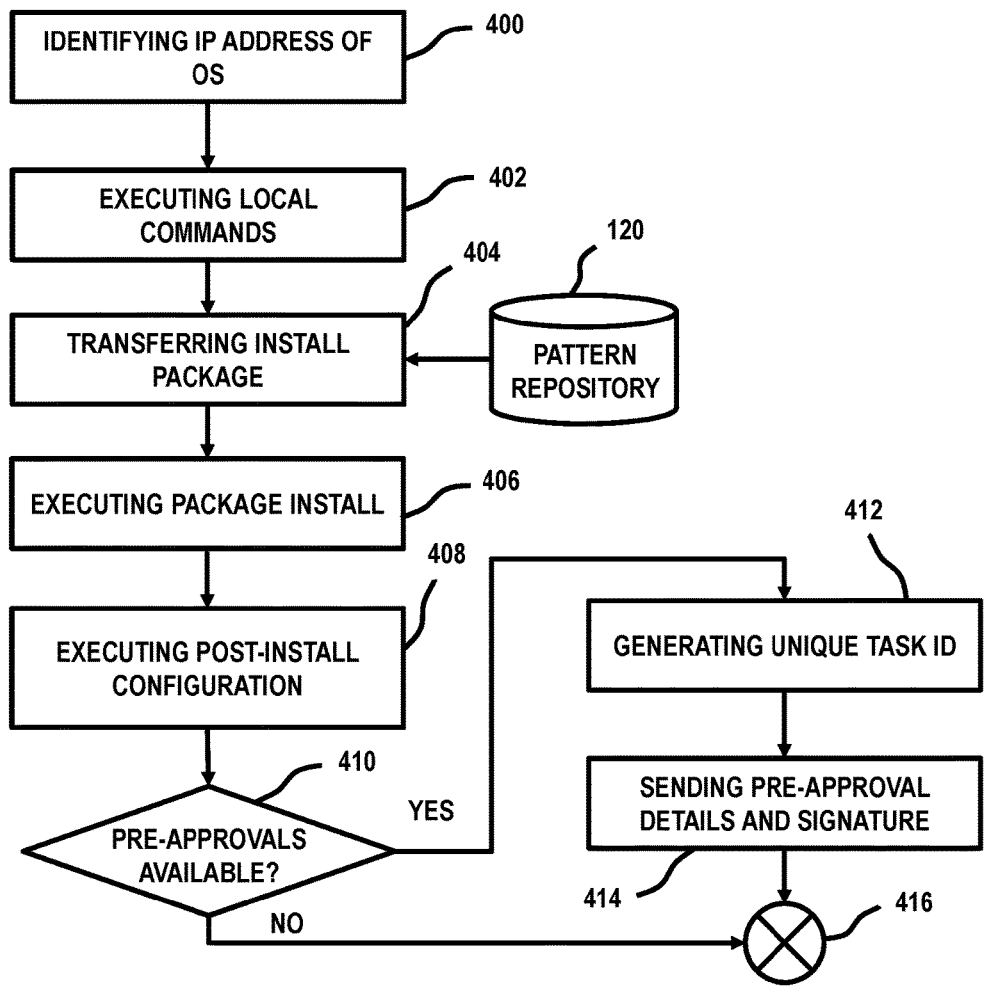
FIG. 4 depicts a schematic block diagram of an exemplary method for installing a pre-approved modification pattern.

FIG. 4 depicts a schematic block diagram of an exemplary method for installing a pre-approved modification pattern. In block 400, the access component of the package management system may identify the IP address of the target OS, e.g. the OS of the target VM. In block 402, the execution component may execute local commands on the target OS. For executing local commands, the execution component may e.g. use SSH to access the target OS. In block 404, the installation component may transfer a package comprising a pre-approved modification pattern from a pattern repository 120 to the target OS. In block 406, the installation component may execute an installation of one or more installable elements on the target OS according to the modification pattern provided by the package. In block 408, the post installation configuration component may execute a post-installation modification of the configuration settings of the target OS. In block 410, the approval component may check, whether compliance exception pre-approvals provided by the package are available. In case no compliance exception pre-approvals are available, the method may end in block 416. In case a compliance exception pre-approval is provided, the approval component may generate a unique task ID of the respective compliance exception pre-approval in block 412. In block 414, details regarding the compliance exception pre-approval as well as a signature of the same may be sent to the compliance management system in block 414. Embodiments of the method may generate in block 412 a unique task ID of each compliance exception pre-approval provided by the package. In block 414, details and signatures of all compliance exception pre-approvals may be sent to the compliance management system. The method may end in block 416.

Figure 5:
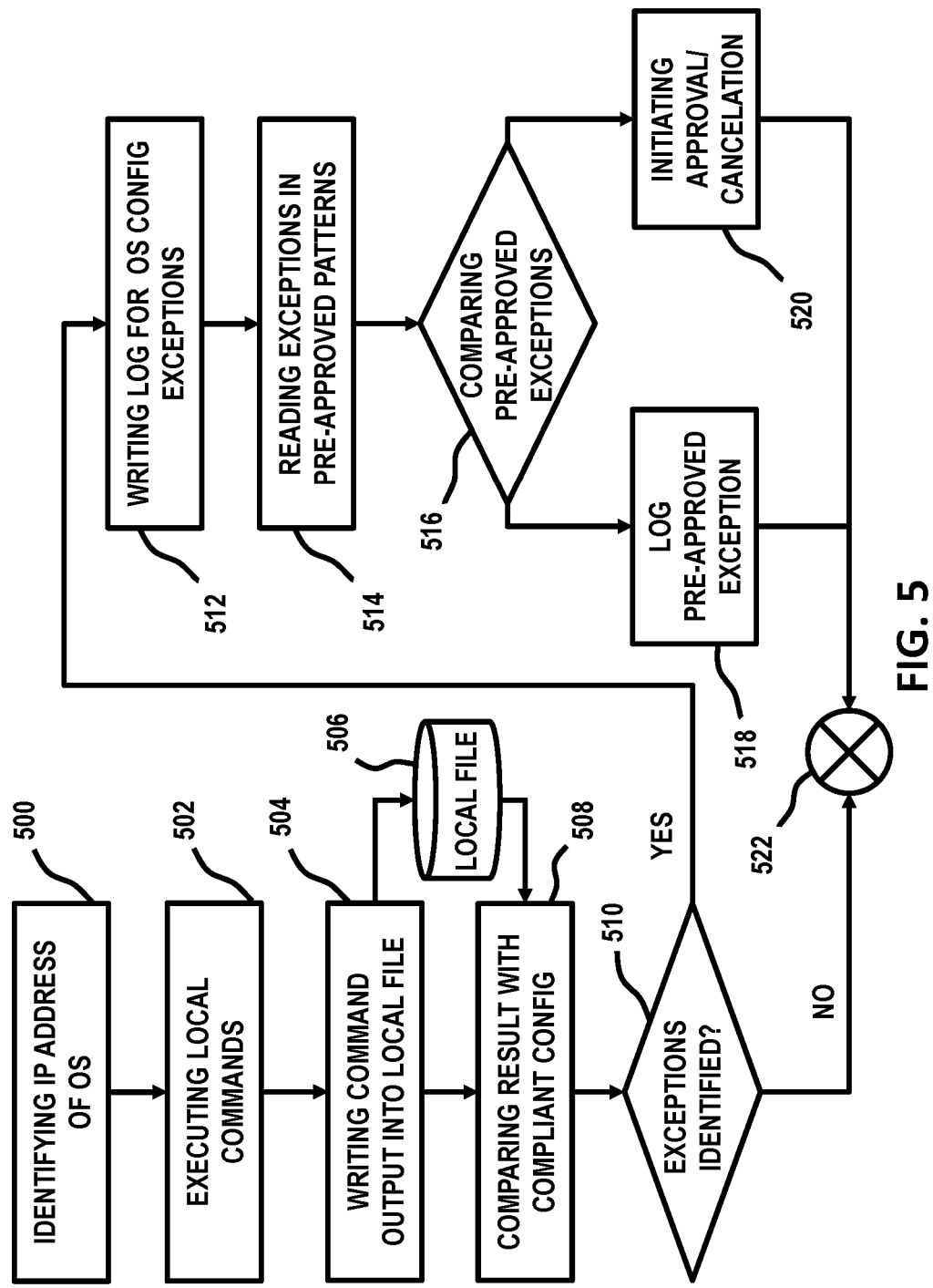
FIG. 5 depicts a schematic block diagram of an exemplary method for automated approval of a non-compliance using compliance exception pre-approvals.

FIG. 5 depicts a schematic block diagram of an exemplary method for automated approval of a non-compliance using compliance exception pre-approvals. In block 500, the access component of the compliance management system may identify the IP address of the target OS, e.g. the OS of the target VM. In block 502, the execution component may execute local commands on the target OS. For executing local commands, the execution component may e.g. use SSH to access the target OS. In block 504, the result receiver may receive output resulting from the execution of the local commands in block 502 and write the received output into a local file 506. The output may be provided by standard streams like stdout, i.e. the stream via which a program writes its output data, or stderr, i.e. the stream generally used by programs to output error messages or diagnostics. In block 508, the result verification component may compare the results received in block 504 with results expected for a compliant configuration of the target OS. In block 510, the result verification component may identify compliance exceptions, i.e. non-compliances. In case a compliance exception is identified, the method may end in block 522.

In case a compliance exception is identified, the result verification component may write a log for the identified configuration exceptions in block 512. In block 514, the non-compliance comparison component may read the pre-approved exceptions provided in the pre-approved modification patterns which have been received by the compliance management system from the package management system. In block 516, the non-compliance comparison component may compare the compliance exceptions identified in block 510 with the pre-approved exceptions read in block 514. In case a compliance exception identified in block 510 matches one of the pre-approved exceptions read in block 514, the automated approval component may automatically approve the respective non-compliance by identifying in a logfile the approved compliance exception as well as the underlying pre-approval. In case a compliance exception identified in block 510 which matches none of the pre-approved exceptions read in block 514, the automated approval component may request for an explicit approval. Such an explicit approval may for example be provided manually by a supervisor. In case no explicit approval is provided, the automated approval component may automatically initiate a cancellation of the modifications responsible for the non-compliance identified in block 510. According embodiments, instructions for remediation actions for resolving the non-compliance may be provided. The term 'remediation actions' refers to one or more actions required to bring the system, in particular the VM, back to a status at which it may be in accordance with the compliance rules defined, i.e. to a compliant status. One or more remediation actions may be applied to the VM using content provided e.g. by a backend repository volume. This way, compliance may be restored back to the VM. The content may comprise scripts, check lists, test rules, predefined remediation actions and/or software packages required to restore compliance of the VM. The method may end in block 522.

Figure 6:
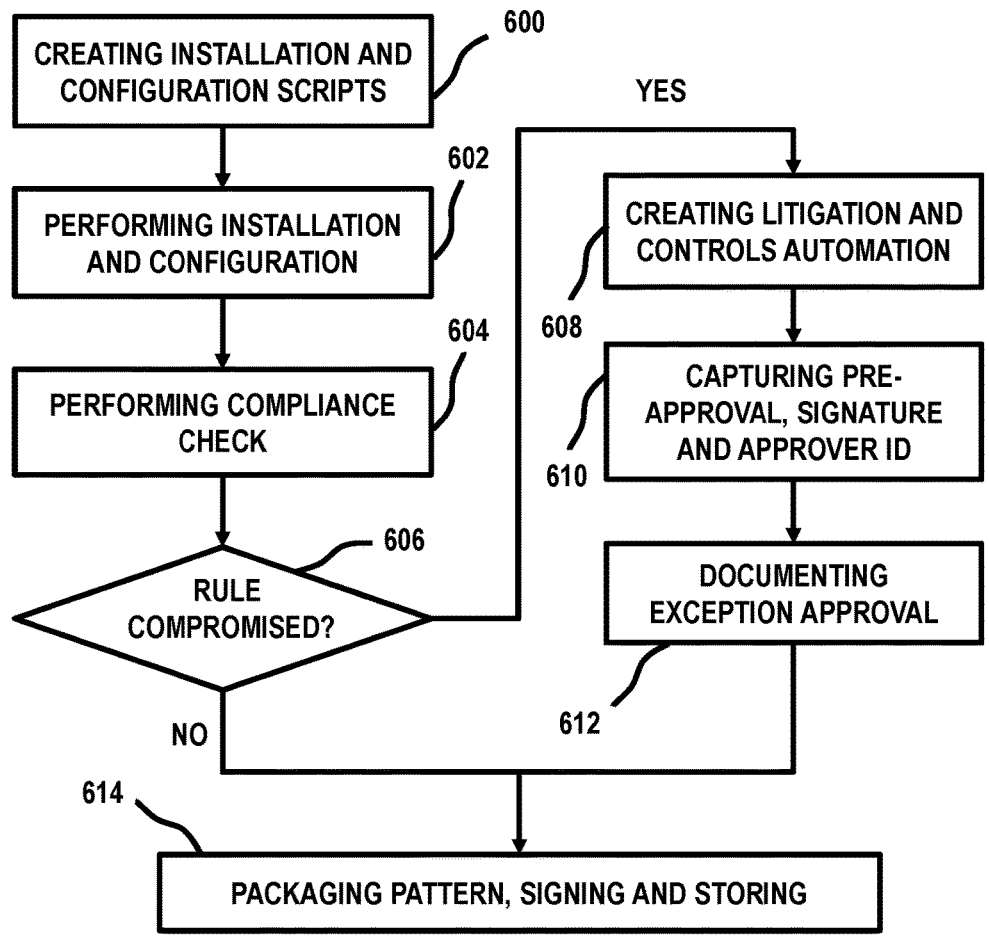
FIG. 6 depicts a schematic block diagram of an exemplary method for generating a pre-approved modification pattern.

FIG. 6 depicts a schematic block diagram of an exemplary method for generating a pre-approved modification pattern. In block 600, a modification pattern is created comprising installation and configuration scripts. In block 602, the modification pattern is deployed using a computer system pre-conditioned for the respective deployment, e.g. a pre-conditioned OS running on a hypervisor. In block 604, a compliance check is performed using a compliance management system, e.g. the compliance management system of FIG. 3 or a compliance management system comprising at least the components 302 to 308. In block 606, the compliance management system determines, whether a pre-defined compliance rule is compromised. In case none of the pre-defined compliance rules is compromised, the method continues in block 614. In block 614, the modification pattern created in block 600 is packaged into a package, signed by a digital signature and stored in a pattern repository. In case a pre-defined compliance rule is compromised, a compliance litigation and secondary control requirements implementation automation may be created in block 608. In block 610, an explicit, e.g. manually generated, compliance exception approval may be received in response to a respective request. The received approval may be used as a compliance exception pre-approval in case an identical non-compliance may occur for the same modification pattern in the future. In block 610, further an ID of the approving authority providing the respective compliance exception pre-approval together with a signature of the same may be captured. In block 612, the respective compliance exception pre-approval may be documented. The method may be continued in block 614 and the modification pattern packaged together with the respective compliance exception pre-approval generating a pre-approved modification pattern in package form.

Figure 7:
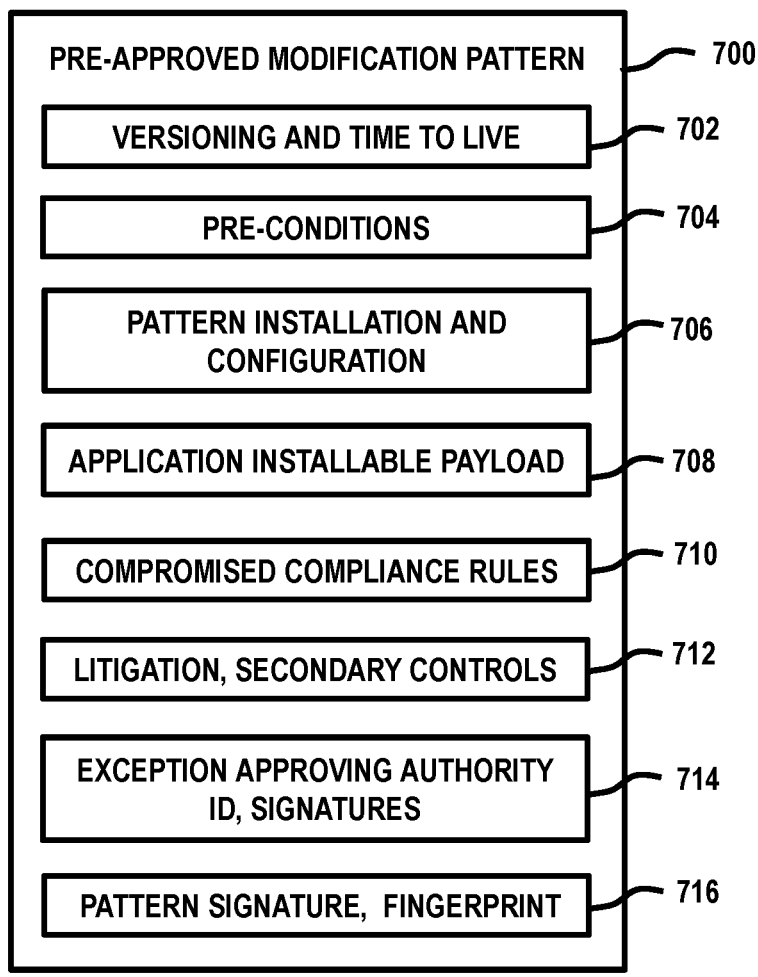
FIG. 7 depicts a schematic diagram illustrating an exemplary pre-approved modification pattern.

FIG. 7 depicts a schematic diagram illustrating an exemplary pre-approved modification pattern 700. The pre-approved modification pattern 700 may comprise identification information 702 regarding the version and period of validity of the respective modification pattern of the pre-approved modification pattern 700. The version identification may e.g. be provided in form of a unique version names or unique version numbers and the period of validity may be identified by an expiration date of validity. After the expiration date a deploying of the modification pattern may be blocked. Pre-approved modification pattern 700 may further comprise a set of pre-conditions 704 which have to be met by the configuration of the computer systems which is to be modified according to the respective modification pattern. In response to determining that the respective configuration does not meet one or more of the respective pre-conditions 704, the configuration may be automatically modified such that all required pre-conditions 704 are met. Thereby, the configuration may be modified by modifying configuration setting and/or by installing additional elements, not comprised by the modification pattern. For example, additional packages comprising pre-approved or non-pre-approved modification pattern may automatically be downloaded and deployed. According to embodiments the automatic download and deployment may be initiated in response to requesting and receiving a respective approval. A further example may be a specific network topology which may have to be implemented by the computer system or in which computer system may have to be integrated.

Furthermore, the pre-approved modification pattern 700 may comprise instructions 706 of the modification pattern specifying which elements are to be installed and which modifications of the configuration settings are to be applied to the computer system. Upon deploying of the modification pattern, these instructions 706 are executed. The instructions 706 may refer to application installable payload 708 of comprised by the pre-approved modification pattern 700 which is to be installed. Furthermore or alternatively, references 708 to the application installable payload may be provided by the package 700. These references may refer to location, e.g. network locations like addresses of download servers and storage locations, from which the respective application installable payload may be received.

Furthermore, the pre-approved modification pattern 700 may comprise information 710 identifying a set of one or more compliance rules compromised by the modification pattern according to instructions 706. For one or more non-compliances induced by compromising the compliance rules according to 706 instructions 712 may be provided regarding litigation of the respective non-compliance and secondary control requirements introducing additional control steps. The package 700 may further comprise one or more IDs of the one or more authorities having approved the compliance exceptions identified by the compromised rule(s) 710 and the assigned measures for litigation and secondary controls 712 as well as one or more digital signatures proving the authenticity and integrity of the respective compliance exceptions. The digital signatures may be generated using an asymmetric cryptographic scheme, like asymmetric cryptographic keys, for signing a hash value, also referred to as digital fingerprint, of the data which authenticity and integrity is to be proven. Asymmetric cryptographic scheme may for example be RSA-based signature schemes, such as RSA-PSS, the digital signature algorithm (DSA) and its elliptic curve variant ECDSA, the ElGamal signature scheme and variants Schnorr signature and Pointcheval-Stern signature algorithm, the Rabin signature algorithm, pairing-based schemes such as BLS, etc. Finally, a digital signature and a digital fingerprint 716 of the package, i.e. the pre-approved modification pattern, may be provided. The digital signature may prove the authenticity and integrity of the respective package and the data contained therein, the fingerprint may provide a unique ID of the respective package.

Figure 8:
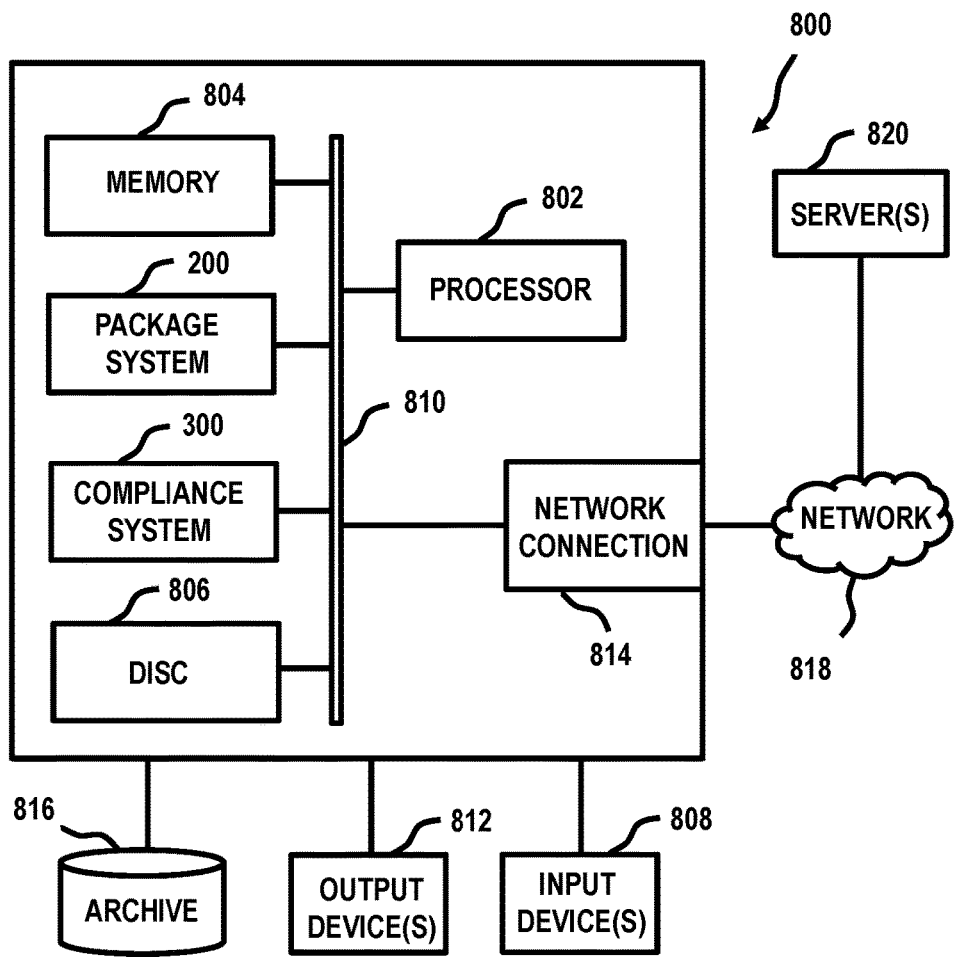
FIG. 8 depicts a schematic diagram illustrating an exemplary computer system for automated approval of a non-compliance.

FIG. 8 depicts a schematic diagram illustrating an exemplary computer system 800 for automated approval of a non-compliance. Embodiments of the invention may be implemented together with virtually any type of computer, regardless of the platform being suitable for storing and/or executing program code providing program instructions.

Computer system 800 may take various forms, such as workstations, laptop computer systems, notebook computer systems, or desktop computer systems and/or clusters thereof. For example, as shown in FIG. 8, a computer system 800 may include one or more processor(s) 802 with one or more cores per processor, associated volatile and/or non-volatile memory elements 804, an internal non-volatile storage device 806, e.g. a hard disk, an optical drive such as a compact disk drive or digital video disk (DVD) drive, a flash memory stick, a solid-state disk, etc., and numerous other elements and functionalities, typical of known computers systems (not shown). The memory elements 804 may include a main memory, e.g. a random access memory (RAM), dynamic random access memory (DRAM), static random access memory (SRAM), or read-only memory (ROM), employed during actual execution of the program code, and a cache memory, which may provide temporary storage of at least some program code and/or data in order to reduce the number of times, code and/or data may have to be retrieved from a long-term storage medium or external bulk storage like an archive 816 for an execution. Elements inside the computer 800 may be linked together by means of a bus system 810 with corresponding adapters. As shown, the compliance management system 300 may be attached to the bus system 810. Further, the package management system 200 may be attached to the bus system 810. The computer system 800 may be a server or a PC or any other mobile device. There may also be an external disk subsystem provided (not shown) which may be attachable to the computing device, e.g., a compliance repository volume. Special adapters may be required for such an attachment of a storage subsystem comprising disk systems.

The computer system 800 may also include input devices 808, such as e.g. a keyboard, a pointing device such as a mouse or a touch pad, or a microphone (not shown). Alternatively, the computer system may be equipped with a touch sensitive screen as main input device. Furthermore, the computer system 800 may include output devices 812, such as a monitor or screen like e.g. a liquid crystal display (LCD), a plasma display, a light emitting diode display (LED), or cathode ray tube (CRT) monitor. An input device and an output device may be implemented in a common hardware device like a display device comprising a touch sensitive screen The output devices may further comprise a loudspeaker for acoustic outputs. The computer system 800 may be connected to a network 818, e.g. a local area network (LAN), a wide area network (WAN), such as the Internet or any other similar type of network, including wireless networks via a network interface connection 814. Network interface connection 814 supports communication of computer system 800 with one or more wired and/or wireless networks 818 utilizing one or more communication protocols, such as 802.x, HTTP, simple mail transfer protocol (SMTP), etc. This may allow a coupling via one or more wired or wireless networks 818 to one or more servers 820 providing access to further computer systems or storage networks or a tape drives. Those, skilled in the art will appreciate that many different types of computer systems exist, and the aforementioned input and output means may take other forms. Generally speaking, the computer system 800 may include at least the minimal processing, input and/or output means, necessary to practice embodiments of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for automated approval of a non-compliance of a modified configuration of a computer system with at least one compliance rule by a compliance management system, the method comprising:

performing a compliance check of the modified configuration of the computer system by the compliance management system, the modified configuration of the computer system resulting from deploying a pre-approved modification pattern by a package management system modifying an initial configuration of the computer system according to a modification pattern, the modification pattern being provided by at least one pre-approved modification pattern as a software package specifying at least one modification to be applied to the initial configuration of the computer system and at least one compliance exception pre-approval assigned to the respective modification pattern, each of the respective at least one pre-approvals specifying a pre-approved non-compliance of at least one of the respective modifications with the at least one compliance rule;

in response to detecting a non-compliance with the at least one compliance rule, comparing the detected non-compliance with the at least one pre-approved non-compliance from the software package provided to the compliance management system by the package management system;

in response to determining that the detected non-compliance is not matching with any of the pre-approved non-compliances, requesting a compliance exception approval for the detected non-compliance; and approving the detected non-compliance in response to receiving the compliance exception approval for the detected non-compliance.

2. The computer-implemented method of claim 1, the method further comprising:

cancelling non-compliant modifications of the initial configuration of the computer system for which no compliance exception approvals are received.

3. The computer-implemented method of claim 1, the modification pattern further comprising machine-readable installation instructions specifying an installation procedure to be applied and machine-readable configuration instructions specifying post-installation configuration adjustments to be applied, the modifying of the first configuration of the first computer system comprising:

executing the respective installation instructions; and
executing the respective configuration instructions.

4. The computer-implemented method of claim 1, the computer system comprising a virtual machine and the modifying of the initial configuration of the computer system comprises modifying software installed on the respective virtual machine.

5. The computer-implemented method of claim 1, the compliance exception pre-approval being assigned with a digital signature and an ID identifying an approving authority, the method further comprising:

verifying, responsive to receiving the compliance exception pre-approval, the signature and the authorization of the approving authority identified by the ID.

6. The computer-implemented method of claim 1, the pre-approved modification pattern being assigned with a digital signature, the method further comprising:

verifying the signature responsive to receiving the pre-approved modification pattern.

7. The computer-implemented method of claim 1, the pre-approved modification pattern further comprising machine-readable mitigation instructions specifying adjustments to be applied to the modifications of the configuration specified by the modification pattern for mitigating non-compliances of the respective modifications, the method further comprising:
    executing the respective mitigation instructions.

8. A computer program product for automated approval of a non-compliance of a modified configuration of a computer system with one or more compliance rules by a compliance management system, the computer program product comprising a computer readable storage medium having program instructions embodied therewith, the program instructions executable by a processor being configured to cause the processor to control a computer system to execute a method comprising:
    performing a compliance check of the modified configuration of the computer system by the compliance management system, the modified configuration of the computer system resulting from deploying a pre-approved modification pattern by a package management system modifying an initial configuration of the computer system according to a modification pattern, the modification pattern being provided by at least one pre-approved modification pattern as a software package specifying at least one modification to be applied to the initial configuration of the computer system and at least one compliance exception pre-approval assigned to the respective modification pattern, each of the respective at least one pre-approvals specifying a pre-approved non-compliance of at least one of the respective modifications with the at least one compliance rule;
    in response to detecting a non-compliance with the at least one compliance rule, comparing the detected non-compliance with the at least one pre-approved non-compliance from the software package provided to the compliance management system by the package management system;
    in response to determining that the detected non-compliance is not matching with any of the pre-approved non-compliances, requesting a compliance exception approval for the detected non-compliance; and
    approving the detected non-compliance in response to receiving the compliance exception approval for the detected non-compliance.

9. The computer program product of claim 8, where the instructions, where the program instructions executable by the processor cause the processor to control a computer system to execute a method comprising:
    cancelling non-compliant modifications of the initial configuration of the computer system for which no compliance exception approvals are received.

10. The computer program product of claim 8, the modification pattern further comprising machine-readable installation instructions specifying an installation procedure to be applied and machine-readable configuration instructions specifying post-installation configuration adjustments to be applied, the modifying of the first configuration of the first computer system comprising:
    executing the respective installation instructions; and
    executing the respective configuration instructions.

11. The computer program product of claim 8, the computer system comprising a virtual machine and the modifying of the initial configuration of the computer system comprises modifying software installed on the respective virtual machine.

12. The computer program product of claim 8, the compliance exception pre-approval being assigned with a digital signature and an ID identifying an approving authority, the method further comprising:
    verifying, responsive to receiving the compliance exception pre-approval, the signature and the authorization of the approving authority identified by the ID.

13. The computer program product of claim 8, the pre-approved modification pattern being assigned with a digital signature, the method further comprising:
    verifying the signature responsive to receiving the pre-approved modification pattern.

14. The computer program product of claim 8, the pre-approved modification pattern further comprising machine-readable mitigation instructions specifying adjustments to be applied to the modifications of the configuration specified by the modification pattern for mitigating non-compliances of the respective modifications, the method further comprising:
    executing the respective mitigation instructions.

15. A computer system for automated approval of a non-compliance of a modified configuration of a computer system with one or more compliance rules by a compliance management system, the computer system comprising a memory for storing machine executable instructions and a processor for executing the machine executable instructions, execution of the machine executable instructions by the processor causing the processor to control the computer system to execute a method comprising:
    performing a compliance check of the modified configuration of the computer system by the compliance management system, the modified configuration of the computer system resulting from deploying a pre-approved modification pattern by a package management system modifying an initial configuration of the computer system according to a modification pattern, the modification pattern being provided by at least one pre-approved modification pattern as a software package specifying at least one modification to be applied to the initial configuration of the computer system and at least one compliance exception pre-approval assigned to the respective modification pattern, each of the respective at least one pre-approvals specifying a pre-approved non-compliance of at least one of the respective modifications with the at least one compliance rule;
    in response to detecting a non-compliance with the at least one compliance rule, comparing the detected non-compliance with the at least one pre-approved non-compliance from the software package provided to the compliance management system by the package management system;
    in response to determining that the detected non-compliance is not matching with any of the pre-approved non-compliances, requesting a compliance exception approval for the detected non-compliance; and
    approving the detected non-compliance in response to receiving the compliance exception approval for the detected non-compliance.

16. The computer system of claim 15, where the instructions are operative with the program to execute the program for:
    cancelling non-compliant modifications of the initial configuration of the computer system for which no compliance exception approvals are received.

17. The computer system of claim 15, the modification pattern further comprising machine-readable installation instructions specifying an installation procedure to be applied and machine-readable configuration instructions specifying post-installation configuration adjustments to be applied, the modifying of the first configuration of the first computer system comprising:
   executing the respective installation instructions; and
   executing the respective configuration instructions.

18. The computer system of claim 15, the computer system comprising a virtual machine and the modifying of the initial configuration of the computer system comprises modifying software installed on the respective virtual machine.

19. The computer system of claim 15, the compliance exception pre-approval being assigned with a digital signature and an ID identifying an approving authority, the method further comprising:
   verifying, responsive to receiving the compliance exception pre-approval, the signature and the authorization of the approving authority identified by the ID.

20. The computer system of claim 15, the pre-approved modification pattern being assigned with a digital signature, the method further comprising:
   verifying the signature responsive to receiving the pre-approved modification pattern.

* * * * *